March 6, 1962

C. B. RICHEY ET AL 3,023,559

HAY PELLETING MACHINE

Filed July 7, 1958

C. B. RICHEY
C. E. McKEON
INVENTORS

BY E. C. McRAE
J. R. FAULKNER
P. F. HILDER

ATTORNEYS

March 6, 1962
C. B. RICHEY ET AL
3,023,559
HAY PELLETING MACHINE
Filed July 7, 1958
5 Sheets-Sheet 2
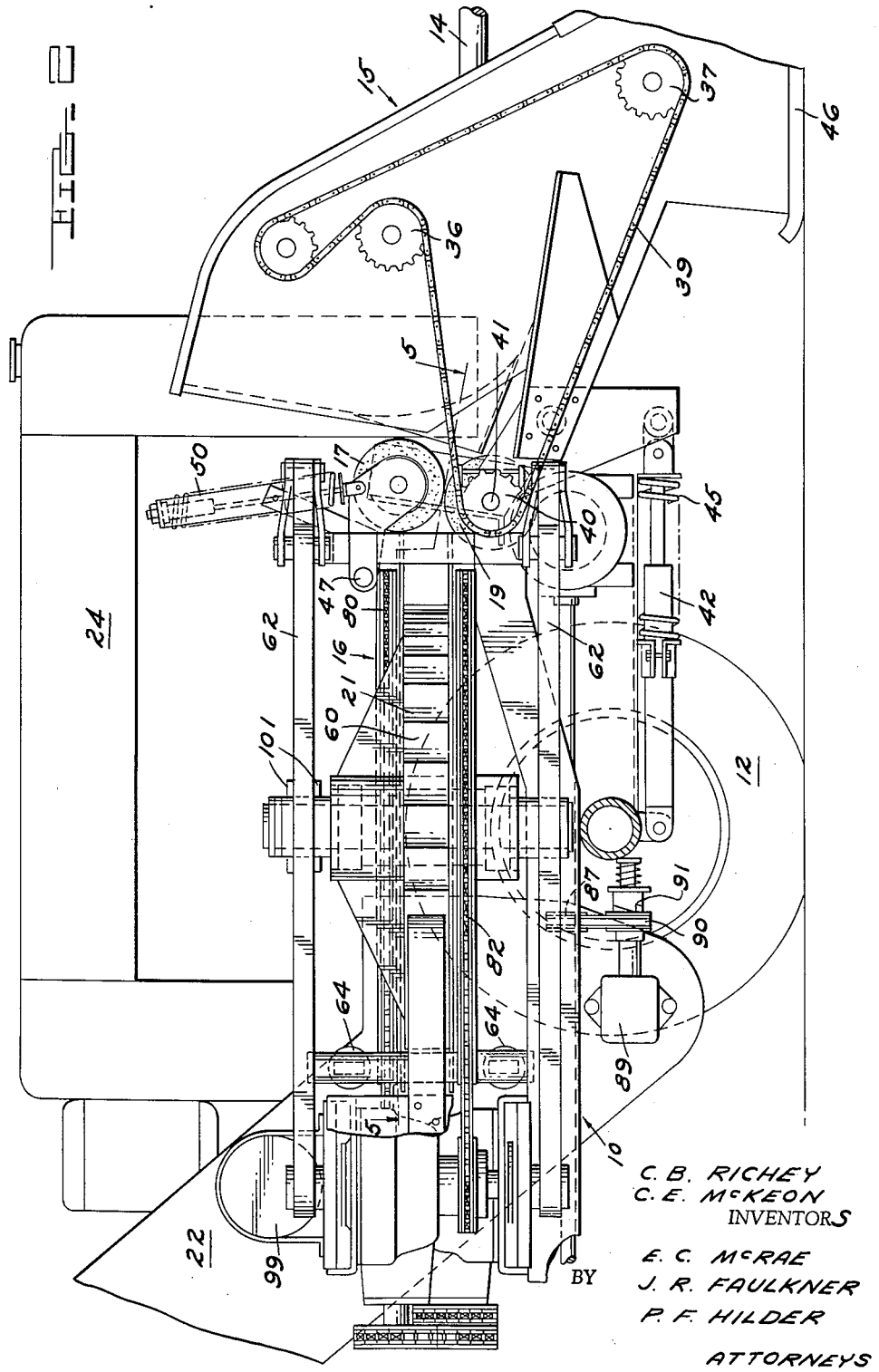
C. B. RICHEY
C. E. McKEON
INVENTORS
E. C. McRAE
J. R. FAULKNER
P. F. HILDER
BY
ATTORNEYS

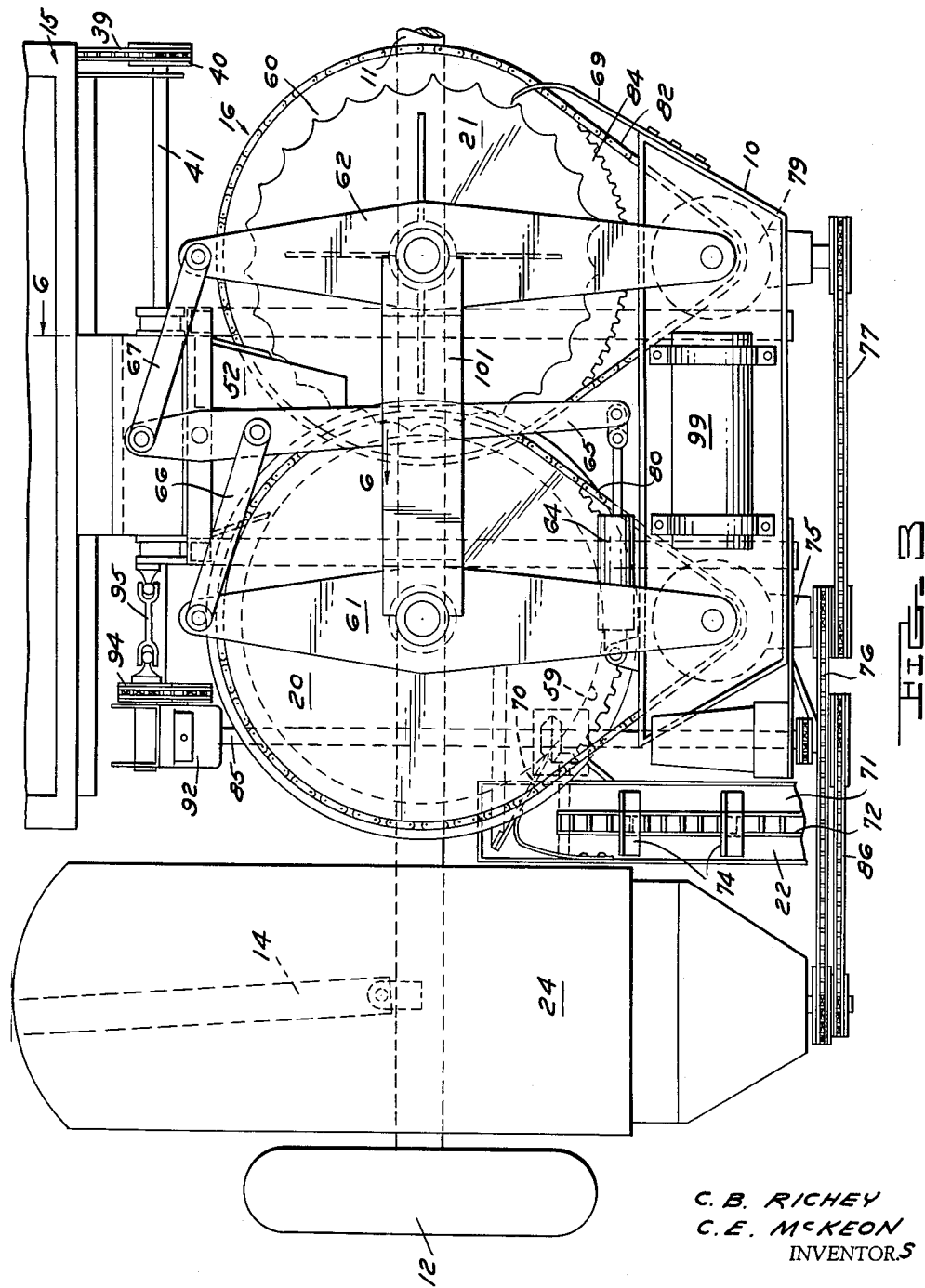

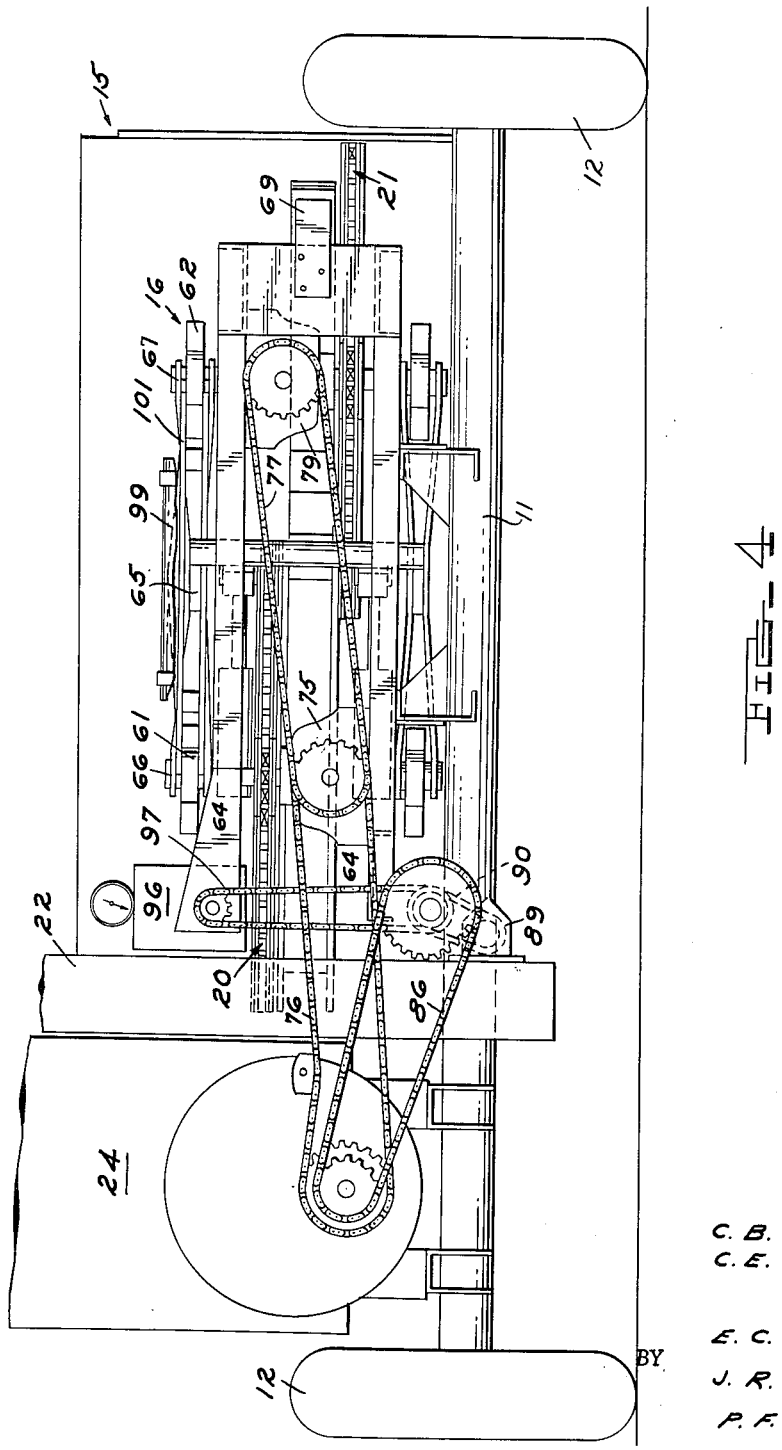

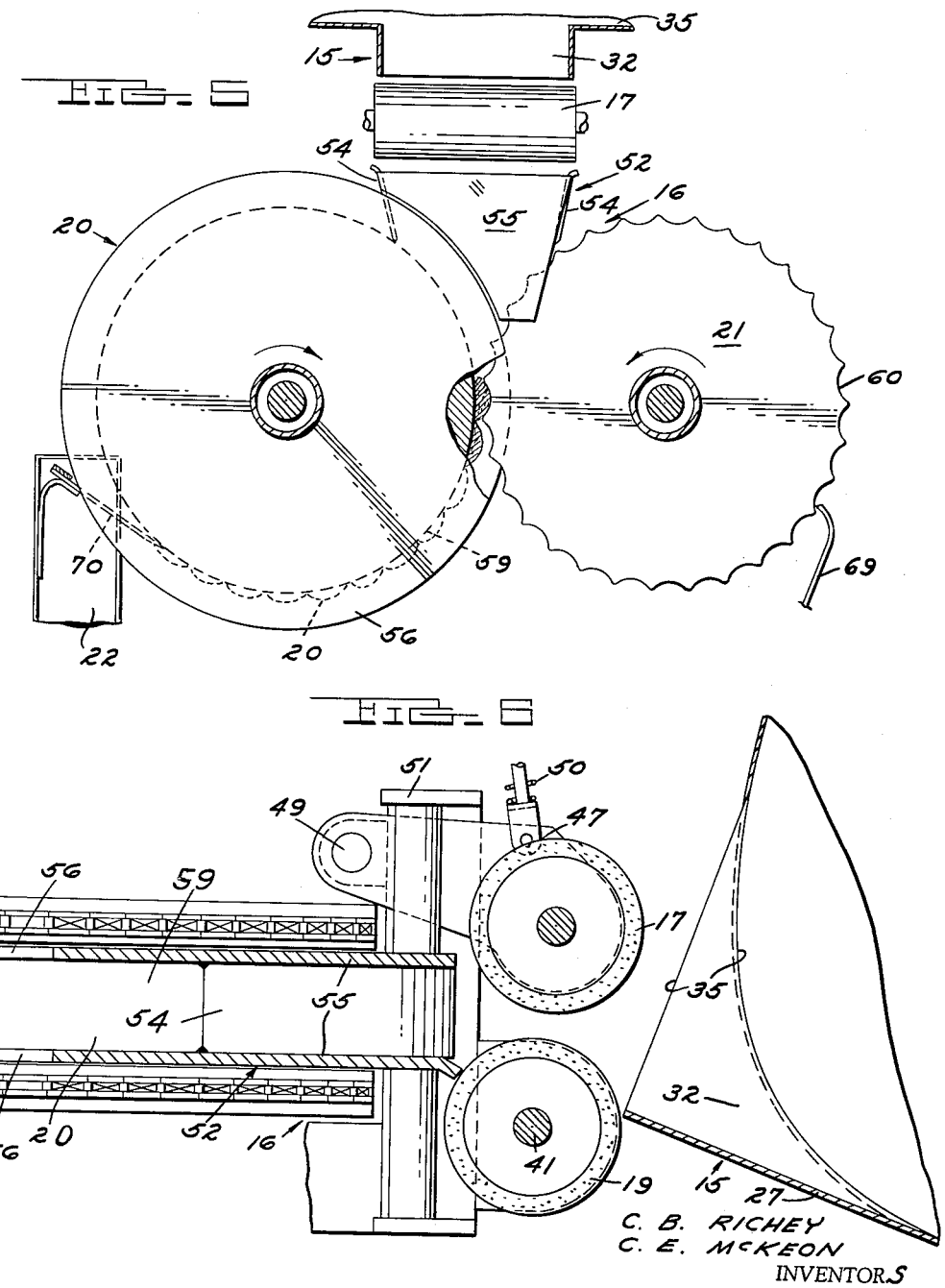

United States Patent Office 3,023,559
Patented Mar. 6, 1962

3,023,559
HAY PELLETING MACHINE
Clarence B. Richey, Royal Oak, and Charles E. McKeon, Birmingham, Mich., assignors to Ford Motor Company, Dearborn, Mich., a corporation of Delaware
Filed July 7, 1958, Ser. No. 746,952
8 Claims. (Cl. 56—1)

This invention relates to a method and machine for the field pelleting of hay, including alfalfa, clover, and the like.

This invention is directed to a method and machine for picking up hay that has previously been cut and permitted to dry in the field, condensing and compressing the hay, and subjecting the hay to high pressure to form small individual cakes or pellets of hay which are self sustaining after the pressure is removed so as to be capable of being handled without disintegration. The individual pellets are of such size that they can be handled conveniently by power conveyors and can be picked up and chewed individually by cattle.

The present invention comprises a machine by which the hay is picked up from a field and passed through the machine in a continuous stream as the machine is moved across the field, the hay preferably first being compressed by a pair of feed rolls or otherwise, and then being highly compressed between a pair of hay pelleting wheels and at the same time severing the hay into individual pellets, and the pellets then being collected and conducted by a conveyor into a trailed wagon. Other features of the present invention relate to an improved design of the pelleting wheels whereby the pellets are retained by a flanged pelleting wheel after being formed and are carried by the flanged wheel to the conveyor. Another feature is the use of an improved form of pelleting wheel facilitating the cleaning of the pellet-forming pockets in the wheel and accomplishing the severing of the pellets as they are compressed.

Among the objects of the present invention are to provide an improved field pickup hay pelleter in which cohesive, self sustaining pellets are formed between two pelleting wheels despite wide variations in the quantity of hay passing through the machine; to provide such a machine in which the individual pellets, after being formed, are carried by one of the pelleting wheels to a conveyor; to provide an improved contour of pelleting wheels; generally to improve hay pelleting machines of the type described; and to provide an improved method for the field pelleting of hay.

Other objects, and objects relating to details and economies of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

FIGURE 2 is an enlarged side elevation of the machine of FIGURE 1, the right hand wheel being omitted and the upper portion of the elevator and forward portions of the crop pickup and tongue being broken away for convenience of illustration.

FIGURE 3 is a top plan view of the machine, the forward portion of the tongue, the forward portion of the crop pickup, and the right hand wheel and axle portion being broken away for convenience of illustration.

FIGURE 4 is a rear elevation of the machine, the top portions of the motor and elevator being broken away.

FIGURE 5 is a horizontal section taken generally along the line 5—5 of FIGURE 2, showing the pelleting wheels and associated parts.

FIGURE 6 is an enlarged vertical section taken along line 6—6 of FIGURE 3, showing the feed rolls and one of the pelleting wheels and associated parts.

Figure 1:
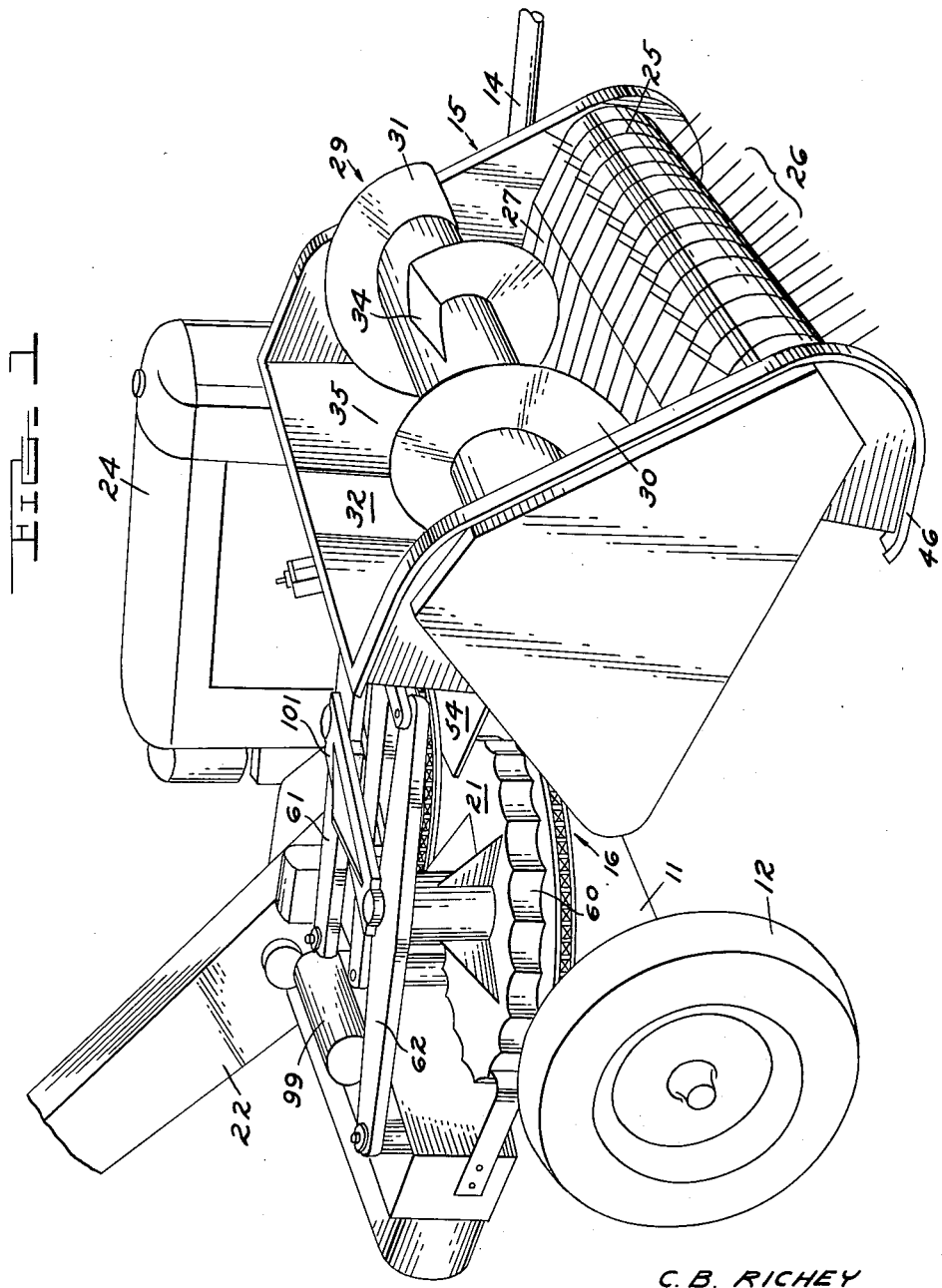
FIGURE 1 is a perspective view of the machine of the present invention, portions of the pellet elevator and the tongue being broken away for convenience of illustration.

The machine of the present invention comprises a frame generally indicated as 10, having a main transverse member 11 upon the ends of which a pair of rubber tired wheels 12 are mounted for supporting the machine. A forwardly extending tongue 14 adapted to be coupled to a tractor extends forwardly from the member 11 of the frame for towing the machine behind the tractor.

A crop pickup 15 is pivotally mounted on a forward portion of the frame 10 to provide for height adjustment of the pickup and to permit the pickup to adapt itself to irregularities of the ground. The crop pickup 15 serves to pick up a windrow of hay, condense it and deliver it rearwardly to the compressing and pelleting section of the machine, equalizing the feed to a certain extent so as to provide a more or less uniform, uninterrupted stream of hay. The crop pickup will be described in detail later in the application.

The hay compressing and pelleting machinery generally indicated as 16 is mounted on the frame 10 which serves to support the various parts in oriented position. This section of the machine comprises a pair of opposed feed rolls 17 and 19 for compressing the hay into a continuous mat of indeterminate length and a pair of pelleting wheels 20 and 21 for receiving the compressed mat of hay from the feed rolls, compressing it sufficiently to form a cohesive, self-sustaining mat of hay which simultaneously is cut transversely by the wheels into a series of individual pellets. The pellets then are carried by one of the wheels to an elevator 22 leading rearwardly to a trailed wagon, not shown, for collecting and transporting the pellets. This portion of the machine will be described in detail later in the application.

The machine is powered by a gasoline engine 24, which supplies a mechanical drive for driving the crop pickup 15, the feed rolls 17 and 19, the pelleting wheels 20 and 21, and the elevator 22. The engine 24 may also serve to power a hydraulic system to be later described for resiliently biasing the pelleting wheels 20 and 21 towards each other at a predetermined force.

The crop pickup 15 serves to lift a window of hay from the ground, condense the windrow and feed it rearwardly to the feed rolls 17 and 19, feeding the hay to the feed rolls more or less uniformly so as to prevent clogging. The pickup 15 consists of a more or less conventional pickup cylinder 25 having a plurality of slots through which spring tines 26 are moved upwardly and rearwardly to pick up hay from the ground and deposit it upon a platform 27 located immediately behind the cylinder. A feed auger 29 having right and left hand flights 30 and 31 feeding towards the center of the platform serves to collect hay picked up by the cylinder 25 and move it centrally of the platform. A pair of rubber flaps, one flap 34 being shown, are mounted on the feed auger 29 at the confronting inner ends of the flights 30 and 31 and serve to direct the windrowed hay rearwardly through an opening 32 centrally located in the back wall 35 of the crop pickup immediately above the platform 27. The rubber flaps are so constructed that upon a heavy section of windrow being picked up, the flaps will deflect and pass over the hay rather than jamming the auger and feed rolls 17 and 19 by feeding excess hay. In this manner, irregularities in the windrow are compensated for and a continuous condensed windrow of more or less uniform density and cross sectional area is fed rearwardly to the feed rolls 17 and 19.

The auger 29 and tines 26 of the pickup cylinder are driven by sprockets 36 and 37 respectively, a drive chain 39 and a sprocket 40 located on the shaft 41 of the lower feed roll 19. The crop pickup 15 is in most respects similar to the pickup shown in Vincent F. Krahn U.S. Patent 2,893,537, issued July 7, 1959.

The crop pickup 15 is pivotally mounted for limited vertical swinging movement about the axis of shaft 41. A single acting hydraulic cylinder 42 extending between the main transverse member 11 of the frame and a downwardly projecting portion 44 of the crop pickup serves, when extended, to lift the pickup for transport. During operation of the machine, the pressure is released from the cylinder 42 and a part of the weight of the crop pickup is supported by a compression spring 45 carried by the cylinder 42, the pickup having a more or less floating mount and bearing lightly on shoes or runners 46 in contact with the ground.

The feed rolls 17 and 19 comprise a pair of generally cylindrical rolls mounted on horizontal transverse axes, the rolls being supported on the forward portion of the frame 10 immediately behind the opening 32 of the crop pickup. At least one, and preferably both, of the rolls are driven, the rolls being counter-rotated so as to feed the hay rearwardly to the pelleting wheels 20 and 21. Preferably, the lower roll 19 is supported on a fixed axis and the axis of the upper roll 17 is carried on a pair of arms 47, 47 pivotally supported on a shaft 49 so that the roll 17 may move in an arc upwardly away from the lower roll 19. A compression spring 50 serves to bias the roll 17 towards the roll 19 and a stop 51 limits the upward movement of roll 17 so that at all times the rolls will compress the hay to form a mat which is no thicker than the width (axial dimension) of the pelleting wheels 20 and 21. One or both of the feed rolls 17 and 19 may be provided with a roughened or abrasive-coated surface to aid in feeding the hay through the rolls, if desired.

A guideway 52 is positioned immediately behind the feed rolls 17 and 19 to confine the mat of hay after it has been compressed by the feed rolls so as to maintain it in a more or less compressed state. The guideway 52 has a rectangular cross section, the height of the interior of the guideway being approximately the width (axial dimension) of the pelleting wheels and the vertically extending side walls 54, 54 of the guideway converging rearwardly to engage the edges of the mat of hay, compress the mat laterally somewhat, and guide it between the pelleting wheels 20 and 21. The top wall 55 of the guideway 52 lies generally in the plane of the top flange 56 of the pelleting wheel 20, being cut away to clear the periphery of the flange. A bottom wall, not shown, of the guideway 52 is formed similarly to the top wall 55 and lies generally in the bottom flange 56 of the pelleting wheel 20. The top and bottom walls of the guideway 52 preferably overlap the periphery of the pelleting wheel 21, so as to hold the mat of hay more or less compressed while it is being fed from the feed rolls to the pelleting wheels.

The pelleting wheels 20 and 21 receive the compressed mat of hay from the guideway 52 and simultaneously compress and cut the hay into individual pellets, as will be explained. The compressed mat of hay preferably is at least several times as wide as it is thick, and the pelleting wheels are arranged so as to compress the mat along its major cross sectional dimension, the mat and the pelleting wheels lying generally in the same plane. Compressing in this direction aids in the inter-meshing of the individual strands of hay so as to form a cohesive mass after pelleting.

The pelleting wheel 20 is a relatively large diameter wheel having a smooth cylindrical peripheral surface of axial dimension approximately the same as the depth of the guideway 52 and slightly greater than the maximum spreading of the feed rolls 17 and 19. The top and bottom peripheral flanges 56, 56 of the pelleting wheel 20 project several inches beyond the surface 59 of the wheel, overlap the pelleting wheel 21 during pelleting so as to prevent the pellets from being extruded axially of the wheels, and, after pelleting, retain the pellets and carry them to the elevator 22, as will be explained.

The pelleting wheel 21 has a diameter preferably about the same as the diameter of wheel 20 and fits closely between the flanges 56, 56 of wheel 20. The peripheral surface 60 of wheel 21 is axially fluted to form a series of smoothly rounded pockets separated by relatively sharp, wedge-shaped portions at the intersections of adjacent pocket walls, as indicated in the drawings. The peripheral surface 60 of the wheel 21 is formed of a continuous line of pockets, each pocket having a curved wall formed of a single curved surface, the elements of which are straight lines parallel to the axis of the wheel. The wedge-shaped portions formed by intersection of the surfaces of adjacent pockets separate the hay into individual pellets while being compressed. It has been found preferable that planes tangent to adjacent pockets at the line of intersection between pockets intersect at an angle between 90 degrees and 150 degrees in order to obtain good pelleting together with good separation of the pellets. Preferably, the pockets in the peripheral surface 60 are cylindrical, the depth of the pockets being on the order of ¼ to ⅙ of the length (peripherally of the wheel), this dimension providing pockets which are easily cleaned and which will separate the hay into individual pellets during the pelleting operation.

The pelleting wheel 20 is pivotally mounted on the midportion of a pair of fore and aft extending arms 61, 61 pivoted at their rear ends to the frame 10 of the pelleter. The wheel 21 is pivotally mounted on a similar pair of arms 62 likewise pivotally mounted on the frame 10 to provide for movement of the pelleting wheels 20 and 21 towards and away from each other.

The pelleting wheels 20 and 21 are pressed together by a single acting hydraulic cylinder 64, lever 65, and links 66 and 67, the links 66 connecting the forward end of the arm 61 with the lever 65 and the links 67 connecting the forward end of arm 62 with the lever. The links 66 and 67 connect to the lever 65 in spaced relation so that as the rear end of the lever is forced to the right by the cylinder 64, the pelleting wheels will be forced together (see FIGURE 3), and the lever 65 is pivoted to the frame 10, midway between its pivotal connections with the links 66 and 67. A similar linkage below the pelleting wheels is operated simultaneously by the cylinder 64 so as to move the lower arms 61 and 62 in a similar manner in order to balance the forces at both ends of the axis of the pelleting wheels. A scraper 69 formed of a strip of spring steel of about the width of the pelleting wheel 21 rides against the wheel at it rotates, following the cylindrical contour of the pockets so as to clean the surface of the wheel and prevent build-up of hay and other matter adhering to the surface of the wheel. The material removed by the scraper 69 is permitted to fall from the machine.

The pelleting wheels 20 and 21 are forced together by the cylinder 64 so as to maintain a pressure on the hay between the rolls of at least 3,000 pounds per square inch. The high pressure to which the hay is subjected for a substantial period of time during its passage between the pelleting wheels causes the hay to be tightly compressed, and at the same time the wedge-shaped portions of wheel 21 between the pockets separate the compressed hay into individual pellets and aid in causing the hay to bind into a cohesive self sustaining pellet. It has been found that the wedging action of the wheel 21 will separate the compressed hay into individual pellets even when the peripheries of the pelleting wheels 20 and 21 are separated by as much as ¼ of an inch or more. It has been found that the ideal moisture content for pelleting is 15 to 20 percent moisture by weight, and that hay above 30 percent and below 5 to 8 percent moisture content shows a tendency to separate after pelleting and will not make satisfactory pellets.

It is believed that the cohesion of the hay into a pellet is caused by the inter-locking of inter-twined stems of hay as they are flattened under high pressure, which causes the hay to hold against separation after the pressure is released. In addition, the wedge-shaped divisions on the wheel 21 between the peripheral pockets tend to burnish the hay at the ends of the pellets somewhat during cutting so as to add to the cohesion of the pellet, while the flanges 56, 56 tend to burnish the side edges of the pellets. Initial compression of the mat of hay by the feed rolls 17 and 19 and subsequent compression at right angles thereto by the pelleting wheels 20 and 21 serves to cause the hay to become inter-twined and materially aids in the cohesion of the pellet.

The hay under pressure of the pelleting wheels 20 and 21 becomes more or less plastic and tends to spread laterally from between the rolls, pressing tightly against the side flanges 56, 56 of the pelleting wheel 21. After passage of the hay between the pelleting wheels 20 and 21 during which separation into individual pellets is accomplished, the pellets are tightly held between the flanges 56, 56, being extracted from the pockets in wheel 21 and carried along the periphery of the smooth pelleting wheel 20. A scraper 70 consisting of a spring steel strip fixed adjacent the lower end of the elevator 22 serves to remove the individual pellets from between the flanges 56, 56 and deposit them on the elevator. Inasmuch as the peripheral surface 59 of the wheel 20 is a smooth, cylindrical surface, the scraper 70 can ride along this surface and extract the individual pellets without breaking them.

The elevator 22 is more or less conventional, having a sheet metal frame 71 forming a rearwardly upwardly extending trough. An endless conveyor chain 72 carried on sprockets, not shown, at the ends of the elevator support the chain 72 and conveyor elements 74 fixed to the chain 72 and extending transversely of the trough-shaped frame 71 carry the pellets upwardly to the top of the elevator, dropping them into a wagon which may be towed behind the pelleter.

The engine 24 is arranged to drive a right-angle-drive gear box 75 by means of a roller chain 76 and sprockets. A second roller chain 77 fixed to the same shaft as a sprocket of the roller chain 76 drives a second right-angle-drive gear box 79 which may be similar to the gear box 75. A roller chain 80, driving from a sprocket on the gear box 75, drives a second sprocket fixed to the pelleting wheel 20. The arm 61 is pivoted to rotate on the same axis as the sprocket for driving the chain 80 so that movement of the arm 61 will not affect the tension of the chain. Similarly a chain 82 drives a sprocket 84 fixed to the pelleting wheel 21 for driving the pelleting wheel from the gear box 79. The two pelleting wheels are driven at the same speed.

A fore-and-aft extending shaft 85 is also driven from the engine 24 by a roller chain 86. A sprocket 87 intermediate the length of the shaft 85 drives a right angle gear box 89 through a chain 90. The gear box 89 is secured to the lower end of the elevator 22 and serves to drive the chain 72 of the elevator. If desired, a jaw clutch 91 may be interposed in the drive to the gear box 89, the jaw clutch being disengaged when pulling the pelleter around turns to avoid dropping pellets off the rear end of the elevator onto the ground when the towed wagon is not in position to receive them.

A second right-angle gear box 92 is located at the forward end of the shaft 85 and by means of sprockets and a drive chain 94 drives the axes of the feed rolls 17 and 19. A double universal joint 95 is interposed in a drive to the upper roll 17 to permit the roll to rise and fall without affecting the drive.

A hydraulic pump 96 is driven from the shaft 85 through a roller chain 97. The pump may be of the fixed-displacement-vane type and serves to maintain a hydraulic accumulator 99 pressurized. The hydraulic accumulator is connected by piping to a pair of single acting hydraulic cylinders 64, 64 extending between a portion of the frame 10 and the rear end of the lever 65, admission of fluid to the cylinders rotating the lever in a direction to draw the pelleting wheel supporting arms 61, 61 and 62, 62 together so as to bias the pelleting wheels 20 and 21 together at a predetermined force so as to yield a unit pressure on the pelleted hay of at least 3,000 p.s.i. and preferably on the order of 4,000 p.s.i. The accumulator 99 serves to maintain a relatively uniform pressure on the pelleting wheels by maintaining a uniform pressure in the cylinders 64, 64, regardless of the amount of hay passing between the pelleting wheels and regardless of whether the hay passing between the wheels has pushed the wheels apart somewhat. A separator 101 is interposed between the axes of the pelleting wheels 20 and 21 to prevent the wheels from contacting each other and to provide for initially loading the wheel supporting linkage when no hay is being passed through the machine.

We claim:

1. In a hay pelleter, a pair of coplanar wheels having opposed pelleting surfaces, including a first wheel having a peripheral zone provided with parallel, radially extending side surfaces and having a series of peripheral pockets extending between the side surfaces of the wheel, adjacent pockets being separated by wedge-shaped portions formed by the intersection of adjacent pocket walls, and a second wheel having a smooth surface coextensive with and confronting the pocketed portion of said first wheel, and a pair of parallel radially extending side flanges on the second wheel, the pocketed peripheral portion of the first wheel fitting closely between the flanges.

2. A hay pelleter as claimed in claim 1, in which the smooth surface of the second wheel is substantially cylindrical in form.

3. A hay pelleter as claimed in claim 2, in which the peripheral pockets of the first wheel are formed of identical smoothly curved arcuate surfaces of uniform cross section axially of the wheel.

4. A hay pelleter as claimed in claim 3, in which the peripheral pockets of the first wheel are of cylindrical contour.

5. A hay pelleter as claimed in claim 2, having relatively movable supports for the axes of the pelleting wheels, a hydraulic cylinder connected with the supports for urging confronting surfaces of the wheels together, and a hydraulic accumulator connected with the hydraulic cylinder for maintaining a more or less uniform pressure in the cylinder.

6. A hay pelleter as claimed in claim 5, having a spacer functionally interposed between the axes of the pelleting wheels to maintain at least a minimum spacing between the confronting surfaces of the wheels.

7. A hay pelleter as claimed in claim 1, having a scraper extending between the flanges of the second wheel and bearing against the smooth surface thereof for extracting the pellets from between the flanges.

8. A hay pelleter as claimed in claim 7 having a hay pickup for picking up a windrow of hay, means for compressing the hay into a continuous mat, and means for feeding the mat continuously between the confronting surfaces of the pelleting wheels.

References Cited in the file of this patent

UNITED STATES PATENTS

| | | |
|---|---|---|
| 1,094,320 | Evans | Apr. 21, 1914 |
| 1,960,548 | Pfeiffer | May 29, 1934 |
| 2,065,141 | Meakin | Dec. 22, 1936 |
| 2,716,317 | McClellan | Aug. 30, 1955 |
| 2,716,318 | Skromme | Aug. 30, 1955 |